United States Patent
Shibagaki

(10) Patent No.: US 7,185,627 B2
(45) Date of Patent: Mar. 6, 2007

(54) CONTROL APPARATUS FOR INTERNAL COMBUSTION ENGINE

(75) Inventor: Nobuyuki Shibagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/295,650

(22) Filed: Dec. 7, 2005

(65) Prior Publication Data

US 2006/0137649 A1  Jun. 29, 2006

(30) Foreign Application Priority Data

Dec. 27, 2004  (JP)  ............... 2004-377248

(51) Int. Cl.
  *F02D 41/22*  (2006.01)
  *F02B 31/04*  (2006.01)
(52) U.S. Cl. ............ 123/308; 123/90.15; 123/306; 123/406.13; 123/431; 123/479
(58) Field of Classification Search ............ 123/90.15, 123/306, 308, 406.13, 406.47, 431, 479
See application file for complete search history.

(56) References Cited

U.S. PATENT DOCUMENTS 5,181,493 A  1/1993  Motoyama et al.
5,357,925 A * 10/1994  Sasaki .................. 123/431
5,634,445 A *  6/1997  Nishioka et al. ......... 123/306
7,055,500 B2 *  6/2006  Miyashita et al. ..... 123/406.47
7,104,255 B2 *  9/2006  Hashima et al. ........ 123/431

FOREIGN PATENT DOCUMENTS

| EP | 1 132 598 A1 | 9/2001 |
| JP | 2-2167316 | * 11/1990 |
| JP | A 07-293260 | 7/1995 |
| JP | A 07-293304 | 11/1995 |
| JP | A 08-200116 | 8/1996 |
| JP | A 2000-145516 | 5/2000 |

* cited by examiner

*Primary Examiner*—T. M. Argenbright
(74) *Attorney, Agent, or Firm*—Oliff & Berridge, PLC

(57) ABSTRACT

An engine ECU executes a program including the step of closing a current control valve in all regions when there is abnormality in a high-pressure system fuel system (YES at S100), the step of setting the VVT overlap to 0, the step of injecting fuel from only an intake manifold injector, the step of corresponding to an ignition timing when the current control valve is closed, and the step of correcting the increased quantity of fuel.

20 Claims, 4 Drawing Sheets

F I G. 1
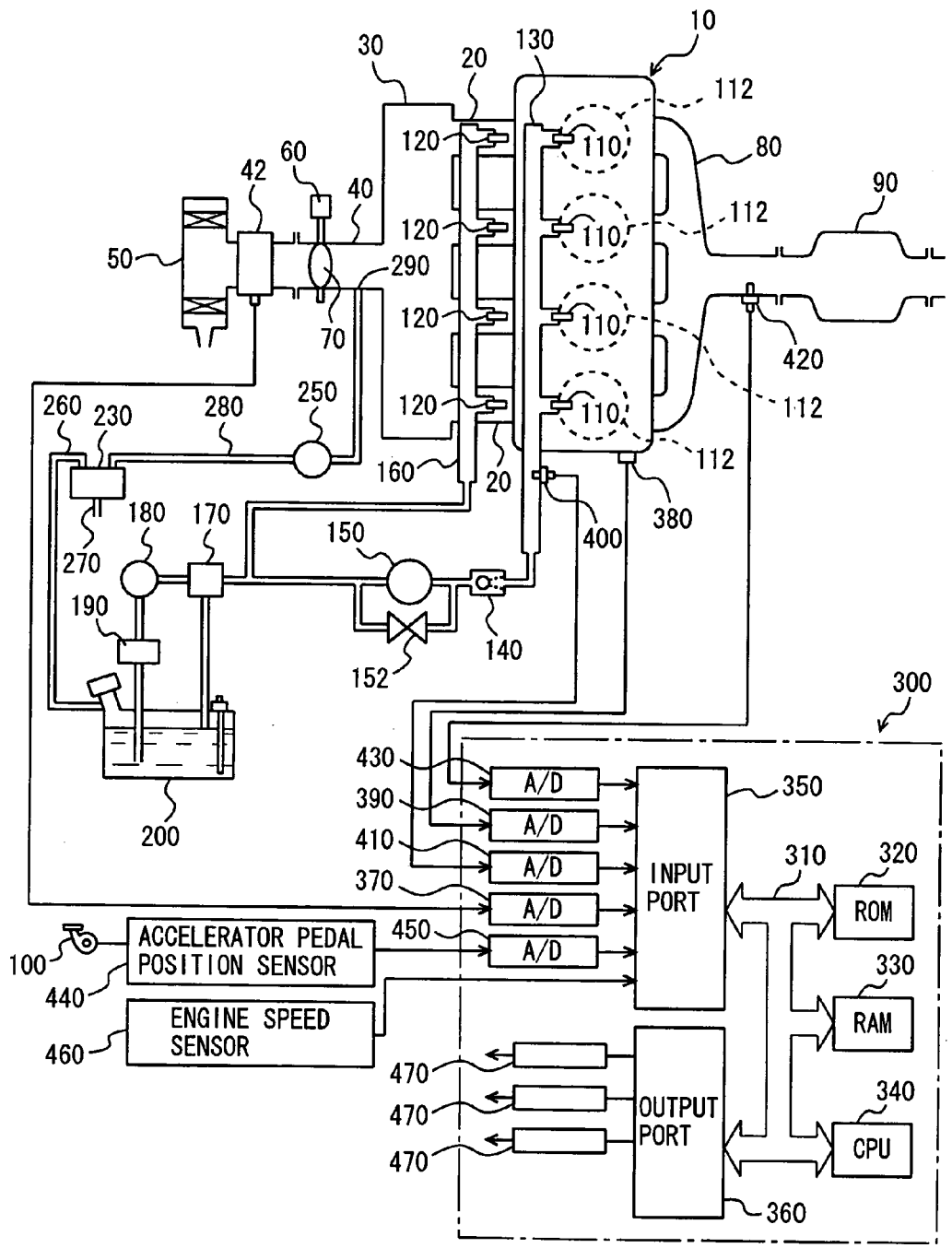

CONTROL APPARATUS FOR INTERNAL COMBUSTION ENGINE

This nonprovisional application is based on Japanese Patent Application No. 2004-377248 filed with the Japan Patent Office on Dec. 27, 2004, the entire contents of which are hereby incorporated by reference.

BACKGROUND OF THE INVENTION

1. Field of the Invention

The present invention relates to an internal combustion engine including a first fuel injection mechanism (in-cylinder injector) for injecting fuel towards a cylinder and a second fuel injection mechanism (intake manifold injector) for injecting fuel towards an intake manifold or an intake port. Particularly, the present invention relates to the technique of achieving combustion stabilization even in the case where abnormality occurs in the fuel supply system that supplies fuel to the first fuel injection mechanism.

2. Description of the Background Art

An internal combustion engine is well known, including an intake manifold injector for injecting fuel into the intake manifold of the engine and an in-cylinder injector for injecting fuel into the engine combustion chamber, wherein the fuel injection ratio of the intake manifold injector to the in-cylinder injector is determined based on the engine speed and engine load.

In the event of operation failure due to a malfunction of the in-cylinder injector or the fuel system that supplies fuel to the in-cylinder injector (hereinafter, referred to as high-pressure fuel supply system), fuel injection by the in-cylinder injector will be ceased.

On the basis of the fail-safe faculty in such operation failure, it is possible to ensure travel by inhibiting fuel injection from the in-cylinder injector and fix the combustion mode at the uniform combustion mode to effect fuel injection from the intake manifold injector alone. However, in the case where the intake manifold injector is set to take an auxiliary role of the in-cylinder injector, fuel of a quantity corresponding to the intake air at the time of full opening of the throttle valve cannot be supplied, whereby the air-fuel ratio in the fail-safe mode will become lean. There may be the case where the torque is insufficient due to combustion defect.

Japanese Patent Laying-Open No. 2000-145516 discloses an engine controlling device that can maintain the air-fuel ratio properly to obtain suitable driving power even during fuel injection control by the intake manifold injector alone in the fail-safe mode caused by operation failure of the in-cylinder injector. This engine controlling device includes an in-cylinder injector that directly injects fuel to the combustion chamber, an intake manifold injector that injects fuel to the intake system, and an electronic control type throttle valve. When the target fuel injection quantity set based on the engine operation state exceeds a predetermined injection quantity of the in-cylinder injector, the engine controlling device compensates for the insufficient quantity by fuel injection from the intake manifold injector. This engine controlling device also includes an abnormality determination unit determining abnormality of the in-cylinder injector and the high-pressure fuel supply system that supplies fuel to the in-cylinder injector, a target fuel correction unit comparing the maximum injection quantity of the intake manifold injector when abnormality is determined with the target fuel injection quantity to fix the target fuel injection quantity at the maximum injection quantity when the target fuel injection quantity exceeds the maximum injection quantity, a target intake air quantity correction unit calculating the target intake air quantity based on the target fuel injection quantity fixed at the maximum injection quantity and the target air-fuel ratio, and a throttle opening indication value calculation unit calculating the throttle opening indication value with respect to an electronic control type throttle valve based on the target intake air quantity.

When abnormality is sensed in the in-cylinder injector and the high-pressure fuel supply system that supplies fuel to the in-cylinder injector in this engine controlling device, the maximum injection quantity of the intake manifold injector is compared with the target fuel injection quantity that is set based on the engine operation state. When the target fuel injection quantity exceeds the maximum injection quantity, the target fuel injection quantity is fixed at the maximum injection quantity. The target intake air quantity is calculated based on this fixed target fuel injection quantity and target air-fuel ratio. The throttle opening indication value is calculated with respect to the electronic control type throttle valve based on the calculated target intake air quantity. Accordingly, when abnormality is sensed in the in-cylinder injector system, fuel injection from the in-cylinder injector is inhibited, and fuel is to be injected from only the intake manifold injector. Based on the maximum injection quantity at this stage and the target air-fuel ratio, the target intake air quantity is calculated. The throttle opening indication value with respect to the electronic control type throttle valve is calculated based on the target intake air quantity. In the fail-safe mode corresponding to failure in the in-cylinder injector system, the throttle opening will open only to the level corresponding to the target air-fuel ratio no matter how hard the acceleration pedal is pushed down. Thus, the air-fuel ratio is maintained properly to obtain suitable driving power.

It is to be noted that the engine controlling device disclosed in Japanese Patent Laying-Open No. 2000-145516 inhibits fuel injection from the in-cylinder injector to conduct fuel injection from only the intake manifold injector when malfunction occurs in the high-pressure fuel supply system. Essentially, fuel is injected from only the in-cylinder injector at the region of high rotation and high load. Since the fuel injected into the cylinder is at high pressure in this context, the fuel is readily atomized due to the large shearing force generated with respect to the intake air. Therefore, a high combustion rate is realized even if the flow of the intake air is absent of a vortex (whirl flow such as a tumble flow that is a vertical whirl, or a swirl flow that is a lateral whirl).

If fuel is injected from only the intake manifold injector with fuel injection from the in-cylinder injector inhibited, as in Japanese Patent Laying-Open No. 2000-145516, the whirl flow in the combustion chamber will not be generated actively. The combustion rate is reduced to render combustion unstable. There is also the possibility of the exhaust temperature being too high.

SUMMARY OF THE INVENTION

An object of the present invention is to provide a control apparatus for an internal combustion engine in which a first fuel injection mechanism that injects fuel into a cylinder and a second fuel injection mechanism that injects fuel into an intake manifold partake in fuel injection, stabilizing combustion to obviate abnormal rise in exhaust temperature when failure occurs at the first fuel injection mechanism side including a fuel supply system towards the first fuel injection mechanism.

According to an aspect of the present invention, a control apparatus for an internal combustion engine controls the internal combustion engine that includes a first fuel injection mechanism injecting fuel into a cylinder, a second fuel injection mechanism injecting fuel into an intake manifold, a first fuel supply mechanism supplying fuel to the first fuel injection mechanism, and a second fuel supply mechanism supplying fuel to the second fuel injection mechanism. The control apparatus includes an abnormality determination unit determining presence of abnormality in at least one of the first fuel injection mechanism and first fuel supply mechanism, a current control valve provided in the intake manifold to control current by altering a whirling state of intake air, and a control unit controlling the first and second fuel injection mechanisms such that the first and second fuel injection mechanisms partake in fuel injection, including a state of injection from one of the first fuel injection mechanism and second fuel injection mechanism being ceased, and also controlling the current control valve. The control unit controls the current control valve such that the intake air whirls in large circles when the abnormality determination unit determines presence of abnormality in one of the first fuel injection mechanism and first fuel supply mechanism.

In accordance with the present invention, fuel of high pressure cannot be injected into the cylinder when there is abnormality in the high-pressure fuel system that supplies fuel into the cylinder (the first fuel injection mechanism and/or first fuel supply mechanism). In this case, fuel is injected, not from the first fuel injection mechanism (for example, in-cylinder injector), but from the second fuel injection mechanism (for example, intake manifold injector). Thus, the difference between the fuel injected at the feed pressure by the intake manifold injector and the fuel injected at high pressure (considerably higher than the feed pressure) by the in-cylinder injector causes difference in the manner of combustion in the combustion chamber. Specifically, the fuel injected at high pressure is readily atomized by collision with the intake air even though the whirling force of the intake air is small since the fuel is at high pressure. In contrast, the pressure injected from the intake manifold injector is not readily atomized since the fuel is at low pressure, liable to slow and unstable combustion. In accordance with the present invention, fuel is injected from the intake manifold injector and a current control valve is employed to cause the intake air in the combustion chamber to whirl in large circles. Accordingly, the delay in the combustion rate corresponding to fuel not atomized can be advanced by means of the current turbulence. The combustion rate can be increased to obviate abnormal rise in exhaust temperature. Thus, there can be provided a control apparatus for an internal combustion engine in which a first fuel injection mechanism that injects fuel into a cylinder and a second fuel injection mechanism that injects fuel to an intake manifold partake in fuel injection, stabilized in combustion to obviate abnormal rise in exhaust temperature when malfunction occurs at the first fuel injection mechanism side including the fuel supply system towards the first fuel injection mechanism.

Preferably, the control unit controls a fuel injection such that fuel is injected from the second fuel injection mechanism.

In accordance with the present invention, combustion stabilization can be realized using the intake manifold injector while implementing the desired performance when malfunction occurs at the in-cylinder injector or the fuel supply system that supplies fuel to the in-cylinder injector.

Further preferably, the control unit controls the fuel injection such that fuel is injected from at least the first fuel injection mechanism using the second fuel supply mechanism when the abnormality determination unit determines presence of abnormality in the first fuel supply mechanism and does not determine presence of abnormality in the first fuel injection mechanism.

In accordance with the present invention, fuel can be injected at the feed pressure even from the in-cylinder injector to obviate formation of deposits at the in-cylinder injector when malfunction occurs, not in the in-cylinder injector itself, but in the fuel supply system that supplies fuel to the in-cylinder injector.

Further preferably, the control apparatus for an internal combustion engine includes, in addition to the configuration of the present invention set forth above, an adjustment unit adjusting a variable valve timing mechanism provided at the internal combustion engine such that, when the abnormality determination unit determines presence of abnormality, overlap of intake valves and exhaust valves is reduced as compared to the case where determination is made of no abnormality.

Since adjustment is conducted such that the overlap of the variable valve timing (VVT) mechanism is eliminated, combustion is further stabilized.

More preferably, the control apparatus for an internal combustion engine further includes an adjustment unit adjusting an ignition system provided at the internal combustion engine such that, when the abnormality determination unit determines presence of abnormality, the ignition timing corresponding to the case where intake air whirls in large circles by the current control valve is taken as the basic ignition timing of the ignition system.

Since the ignition system is controlled based on a basic ignition timing corresponding to the case where the intake air whirls in large circles by the current control valve, an appropriate ignition timing corresponding to the current can be set to further stabilize combustion.

Further preferably, the control apparatus for an internal combustion engine further includes a calculation unit calculating the quantity of fuel injected from the fuel injection mechanism corresponding to a whirling state of the intake air by the current control valve.

In accordance with the present invention, a favorable combustion state is achieved even with a lower quantity of fuel as the whirling state of intake air becomes larger. A favorable combustion state cannot be achieved unless the quantity of fuel is increased as the whirling state of intake air becomes smaller. Since the quantity of fuel is increased according to the whirling state of intake air, combustion is stabilized and the desired output can be implemented within a range in which combustion is established.

More preferably, the control apparatus further includes a calculation unit calculating the quantity of fuel injected from the fuel injection mechanism such that the air-fuel ratio attains the target air-fuel ratio based on the quantity of intake air when the current control valve is controlled such that the intake air whirls in large circles.

Since the quantity of fuel is increased according to the intake whirling state to achieve the target air-fuel ratio in accordance with the present invention, combustion is stabilized and the desired output can be implemented in a range in which combustion is established.

Further preferably, the current control valve is provided at at least one of two or more channels that divide intake air introduced into one combustion chamber. The current control valve is closed to cause the intake air to whirl in large circles.

By closing, for example, a swirl control valve that controls the lateral whirl flow and/or a tumble control valve that controls the vertical whirl flow in accordance with the present invention, the intake air is altered such that the magnitude of whirl in the lateral direction or vertical direction is intensified.

Further preferably, the direction of whirl is at least either a direction parallel to or vertical to the reciprocation direction of a piston.

By virtue of the swirl flow parallel to the reciprocation direction of a piston or the tumble flow vertical to the reciprocation direction of a piston in accordance with the present invention, stabilization of combustion can be realized even in the case where the in-cylinder injector that injects fuel at high pressure malfunctions.

Further preferably, the first fuel injection mechanism is an in-cylinder injector, and the second fuel injection mechanism is an intake manifold injector.

In accordance with the present invention, a control apparatus for an internal combustion engine in which an in-cylinder injector identified as the first fuel injection mechanism and an intake manifold injector identified as the second fuel injection mechanism partake in fuel injection can be provided, wherein the current (whirl) in the combustion engine can be intensified using a current control valve to stabilize combustion and obviate abnormal rise in exhaust temperature even in the case where the first fuel supply mechanism (for example, a high-pressure pump) that supplies fuel to the in-cylinder injector malfunctions or one of the plurality of in-cylinder injectors malfunctions.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically shows a configuration of an engine system under control of a control apparatus according to an embodiment of the present invention.

DESCRIPTION OF THE PREFERRED EMBODIMENTS

Figure 2:
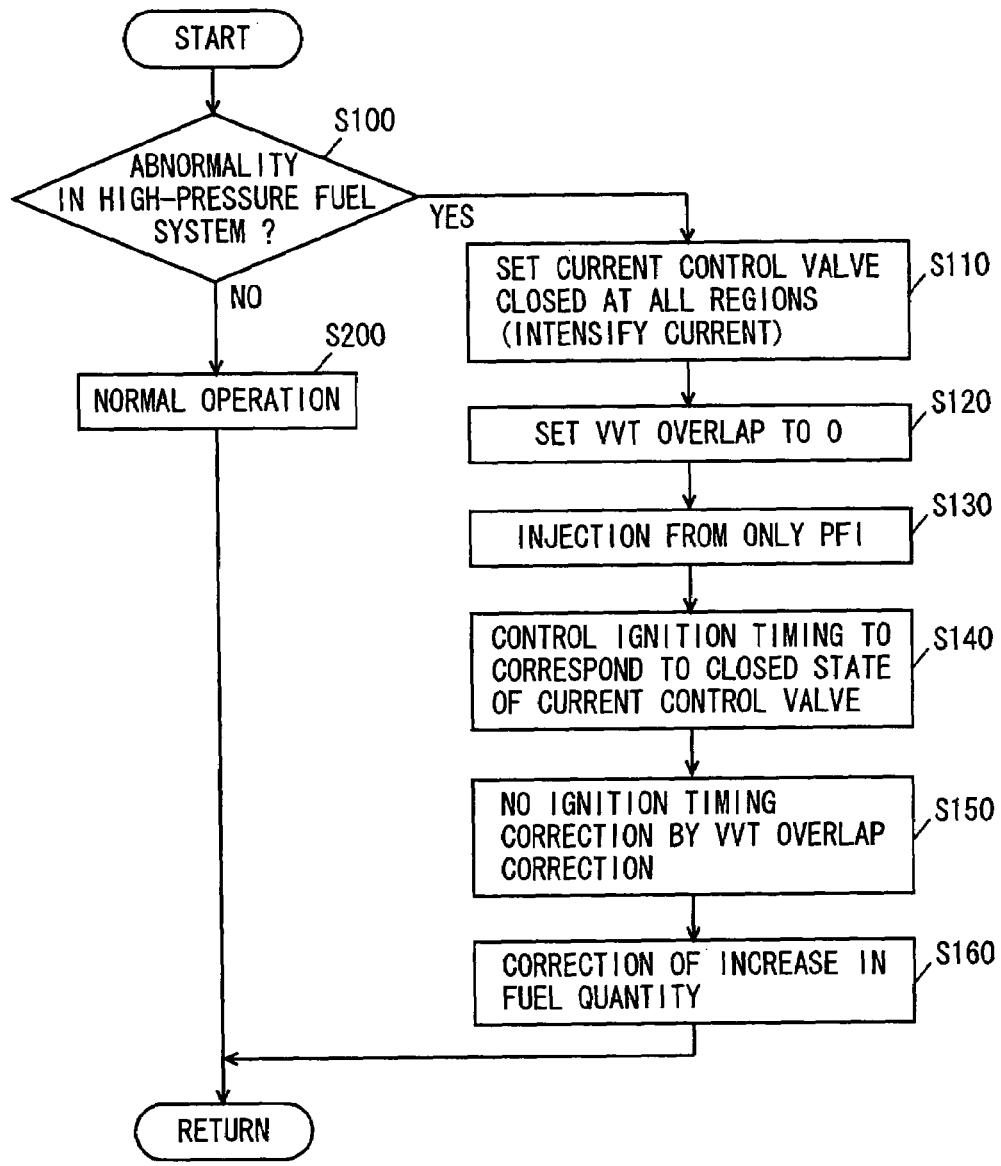
FIG. 2 is a flow chart of a control structure of a program executed by an engine ECU that is the control apparatus according to an embodiment of the present invention.

Embodiments of the present invention will be described hereinafter with reference to the drawings. The same components have the same reference characters allotted, and their designation and function are also identical. Therefore, detailed description thereof will not be repeated.

FIG. 1 is a schematic view of a structure of an engine system under control of an engine ECU (Electronic Control Unit) identified as a control apparatus for an internal combustion engine according to an embodiment of the present invention. Although an in-line 4-cylinder gasoline engine is indicated as the engine, the present invention is not limited to such an engine.

As shown in FIG. 1, an engine 10 includes four cylinders 112, each connected to a common surge tank 30 via a corresponding intake manifold 20. Surge tank 30 is connected via an intake duct 40 to an air cleaner 50. An airflow meter 42 is arranged in intake duct 40, and a throttle valve 70 driven by an electric motor 60 is also arranged in intake duct 40. Throttle valve 70 has its degree of opening controlled based on an output signal of an engine ECU 300, independently from an accelerator pedal 100. Each cylinder 112 is connected to a common exhaust manifold 80, which is connected to a three-way catalytic converter 90.

Each cylinder 112 is provided with an in-cylinder injector 110 for injecting fuel into the cylinder and an intake manifold injector 120 for injecting fuel into an intake port or/and an intake manifold. Injectors 110 and 120 are controlled based on output signals from engine ECU 300. Further, in-cylinder injector 110 of each cylinder is connected to a common fuel delivery pipe 130. Fuel delivery pipe 130 is connected to a high-pressure fuel pump 150 of an engine-driven type, via a check valve 140 that allows a flow in the direction toward fuel delivery pipe 130. Although an internal combustion engine having two injectors separately provided will be explained in the present embodiment, the present invention is not restricted to such an internal combustion engine. For example, the internal combustion engine may have one injector that can effect both in-cylinder injection and intake manifold injection.

As shown in FIG. 1, the discharge side of high-pressure fuel pump 150 is connected via an electromagnetic spill valve 152 to the intake side of high-pressure fuel pump 150. As the degree of opening of electromagnetic spill valve 152 is smaller, the quantity of the fuel supplied from high-pressure fuel pump 150 into fuel delivery pipe 130 increases. When electromagnetic spill valve 152 is fully open, the fuel supply from high-pressure fuel pump 150 to fuel delivery pipe 130 is ceased. Electromagnetic spill valve 152 is controlled based on an output signal of engine ECU 300.

Specifically, the closing timing during a pressurized stroke of electromagnetic spill valve 152 provided at the pump intake side of high-pressure fuel pump 150 that applies pressure on the fuel by the vertical operation of a pump plunger through a cam attached to a cam shaft is feedback-controlled through engine ECU 300 using a fuel pressure sensor 400 provided at fuel delivery pipe 130, whereby the fuel pressure in fuel delivery pipe 130 (fuel pressure) is controlled. In other words, by controlling electromagnetic spill valve 152 through engine ECU 300, the quantity and pressure of fuel supplied from high-pressure fuel pump 150 to fuel delivery pipe 130 are controlled.

Each intake manifold injector 120 is connected to a common fuel delivery pipe 160 at the low pressure side. Fuel delivery pipe 160 and high-pressure fuel pump 150 are connected to an electromotor driven type low-pressure fuel pump 180 via a common fuel pressure regulator 170. Low-pressure fuel pump 180 is connected to fuel tank 200 via fuel filter 190. When the fuel pressure of fuel ejected from low-pressure fuel pump 180 becomes higher than a predetermined set fuel pressure, fuel pressure regulator 170 returns a portion of the fuel output from low-pressure fuel pump 180 to fuel tank 200. Accordingly, the fuel pressure supplied to intake manifold injector 120 and the fuel pressure supplied to high-pressure fuel pump 150 are prevented from becoming higher than the set fuel pressure.

Engine ECU 300 is based on a digital computer, and includes a ROM (Read Only Memory) 320, a RAM (Random Access Memory) 330, a CPU (Central Processing Unit) 340, an input port 350, and an output port 360, connected to each other via a bidirectional bus 310.

Air flow meter 42 generates an output voltage in proportion to the intake air. The output voltage from air flow meter 42 is applied to input port 350 via an A/D converter 370. A coolant temperature sensor 380 producing an output voltage in proportion to the engine coolant temperature is attached to engine 10. The output voltage from coolant temperature sensor 380 is applied to input port 350 via an A/D converter 390.

A fuel pressure sensor 400 producing an output voltage in proportion to the fuel pressure in high pressure delivery pipe 130 is attached to high pressure delivery pipe 130. The output voltage from fuel pressure sensor 400 is applied to input port 350 via an A/D converter 410. An air-fuel ratio sensor 420 producing an output voltage in proportion to the oxygen concentration in the exhaust gas is attached to exhaust manifold 80 upstream of 3-way catalytic converter 90. The output voltage from air-fuel ratio 420 is applied to input port 350 via an A/D converter 430.

Air-fuel ratio sensor 420 in the engine system of the present embodiment is a full-range air-fuel ratio sensor (linear air-fuel sensor) producing an output voltage in proportion to the air-fuel ratio of air-fuel mixture burned at engine 10. Air-fuel ratio sensor 420 may be an $O_2$ sensor that detects whether the air-fuel ratio of air-fuel mixture burned at engine 10 is rich or lean to the stoichiometric ratio in an on/off manner.

An accelerator pedal position sensor 440 producing an output voltage in proportion to the pedal position of an accelerator pedal 100 is attached to accelerator pedal 100. The output voltage from accelerator pedal position sensor 440 is applied to input port 350 via an A/D converter 450. A revolution speed sensor 460 generating an output pulse representing the engine speed is connected to input port 350. ROM 320 of engine ECU 300 stores the value of the fuel injection quantity set corresponding to an operation state, a correction value based on the engine coolant temperature, and the like that are mapped in advance based on the engine load factor and engine speed obtained through accelerator pedal position sensor 440 and revolution speed sensor 460 set forth above.

A canister 230 that is a vessel for trapping fuel vapor dispelled from fuel tank 200 is connected to fuel tank 200 via a paper channel 260. Canister 230 is further connected to a purge channel 280 to supply the fuel vapor trapped therein to the intake system of engine 10. Purge channel 280 communicates with a purge port 290 that opens downstream of throttle valve 70 of intake duct 40. As well known in the field of art, canister 230 is filled with an adsorbent (activated charcoal) adsorbing the fuel vapor. An air channel 270 to introduce air into canister 230 via a check valve during purging is formed in canister 230. Further, a purge control valve 250 controlling the amount of purging is provided in purge channel 280. The opening of purge control valve 250 is under duty control by engine ECU 300, whereby the amount of fuel vapor that is to be purged in canister 230, and in turn the quantity of fuel introduced into engine 10 is controlled.

Although not shown in FIG. 1, an intake manifold 20 of engine 10 includes a swirl control valve (SCV), identified as a current control valve, to generate actively a lateral whirl in the combustion engine. Intake manifold 20 of engine 10 includes two independent intake ports with respect to one cylinder. The swirl control valve that can open/close under control of engine ECU 300 is provided at at least one of the intake ports. When this swirl control valve is completely closed, the flow rate of the intake air passing through the other intake port is increased to intensify the flow in the lateral direction in the combustion chamber. The swirl control valve can be completely open to intensify the flow in the vertical direction in the combustion chamber.

A tumble control valve (TCV), identified as a current control valve, that can actively generate a vertical whirl in the combustion chamber can be provided at intake manifold 20 of engine 10 instead of (or in addition to) the swirl control valve set forth above. By the tumble control valve, the flow in the vertical direction in the combustion chamber is intensified. The swirl control valve and tumble control valve well known in the field of art can be employed.

A control structure of a program executed by engine ECU 300 identified as the control apparatus of the present embodiment will be described with reference to FIG. 2. The program in this flow chart is executed at a predetermined interval of time, or at a predetermined crank angle of engine 10.

At step (hereinafter, step abbreviated as S) 100, engine ECU 300 determines whether abnormality in the high-pressure fuel system is sensed or not. For example, abnormality in the high-pressure fuel system is sensed when the engine-driven type high-pressure fuel pump fails so that the fuel pressure sensed by a fuel pressure sensor 400 is below a predetermined threshold value, or when the feedback control executed using fuel pressure sensor 400 is not proper. When abnormality in the high-pressure fuel system is sensed (YES at S100), control proceeds to S110, otherwise (NO at S100), control proceeds to S200.

At S110, engine ECU 300 completely closes the current control valve in the entire operation region of engine 10 (such that the current is intensified).

At S120, engine ECU 300 sets the overlap of the intake valves and exhaust valves to 0 by the VVT.

At S130, engine ECU 300 inhibits fuel injection from in-cylinder injector 100, and allows fuel to be injected from only intake manifold injector 120.

At S140, engine ECU 300 controls the ignition timing based on a preset basic ignition timing such that the current control valve corresponds to a closed state. Specifically, the basic ignition timing corresponding to the case where the current control valve is closed so that the current in the combustion engine is intensified is set as the basic ignition timing of the ignition system. In general, different maps are prepared in advance corresponding to the state where the current control valve is open and the state where the current control valve is closed. Therefore, the map corresponding to the case where the current control valve is closed is taken as the basic ignition timing map.

At S150, engine ECU 300 sets the correction of the ignition timing by the VVT overlap correction to 0 (from the basic ignition timing set at S140). The VVT overlap becomes 0, and the ignition timing correction that is generally corrected in cooperation with the VVT becomes 0.

At S160, engine ECU 300 conducts correction such that the quantity of fuel is increased. This fuel injection correction at this stage is determined using a preset map based on the fact that fuel is injected from only intake manifold injector 120 and the current control valve is closed. Although the amount of correction corresponding to the increase in fuel is generally determined taking into consideration fuel injection from in-cylinder injector 110, the amount of correction for increase is determined based on fuel injection from intake manifold injector 120. As a result, the value corresponding to the increase becomes larger, as compared to the normal state (when injection is conducted in a partaking manner, or when fuel is injected by in-cylinder injector 110). Here, the quantity of fuel that can realize the target air-fuel ratio can be cited as one factor in calculating the required amount of fuel.

At S200, engine ECU 300 controls engine 10 such that normal operation is executed.

An operation of engine 10 under control of engine ECU 300 that is the control apparatus of an internal combustion engine according to the present embodiment based on the configuration and flow chart set forth above will be described hereinafter.

When high-pressure fuel pump 150 or a valve provided at the delivery system, for example, malfunctions, determination is made of presence of abnormality in the high-pressure fuel system (YES at S100). The current control valve is set completely closed in the entire region of the operation region of engine 10 so as to intensify the current (whirl) in the combustion chamber. The VVT overlap is set to 0 (S120), and fuel is injected from intake manifold injector 120 alone (S130).

The ignition timing corresponding to a completely closed state of the current control valve is set as the basic ignition timing (S140). Control is effected to suppress correction of the ignition timing by the VVT overlap correction (S150). The quantity of fuel injected from intake manifold injector 120 is corrected to be increased based on the case using intake manifold injector 120, not in-cylinder injector 110. Accordingly, the event of insufficient fuel injection from intake manifold injector 120 can be obviated.

Pressure cannot be injected into the cylinder at high pressure when the in-cylinder injector per se malfunctions or when the high-pressure fuel system that supplies fuel to the in-cylinder injector malfunctions as set forth above. Therefore, the whirl flow in the combustion chamber is intensified by means of the current control valve to increase the combustion rate of the air-fuel ratio injected from the intake manifold injector and introduced into the combustion chamber. Accordingly, a combustion rate approximating that corresponding to fuel injection through an in-cylinder injector can be achieved. Thus, a favorable combustion state can be realized, and abnormal increase in exhaust temperature due to the slow combustion rate can be obviated.

At the process of S130 of FIG. 2, fuel can be injected from in-cylinder injector 110 at the feed pressure, if not malfunctioning, in addition to or instead of the fuel injection from intake manifold injector 120. This is preferable from the standpoint of preventing generation of deposits at the injection hole of in-cylinder injector 110.

<Engine (1) to which Present Control Apparatus can be Suitably Applied>

An engine (1) to which the control apparatus of the present embodiment is suitably adapted will be described hereinafter.

Figure 3:
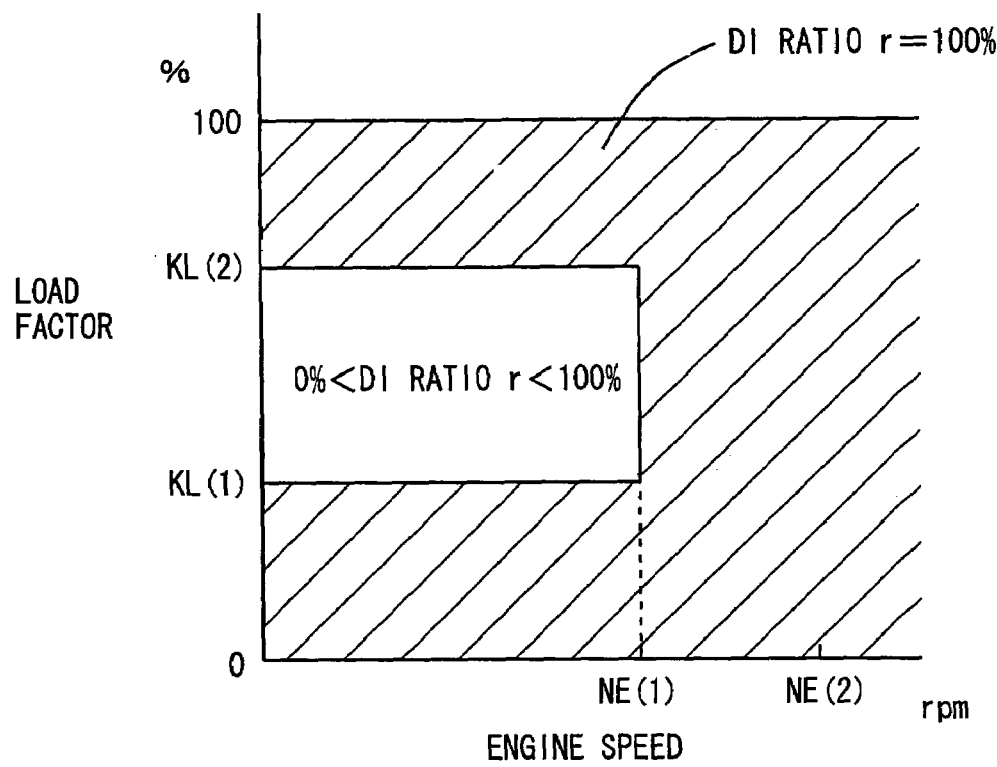
FIG. 3 represents a DI ratio map corresponding to a warm state of an engine to which the control apparatus of an embodiment of the present invention is suitably adapted.
Figure 4:
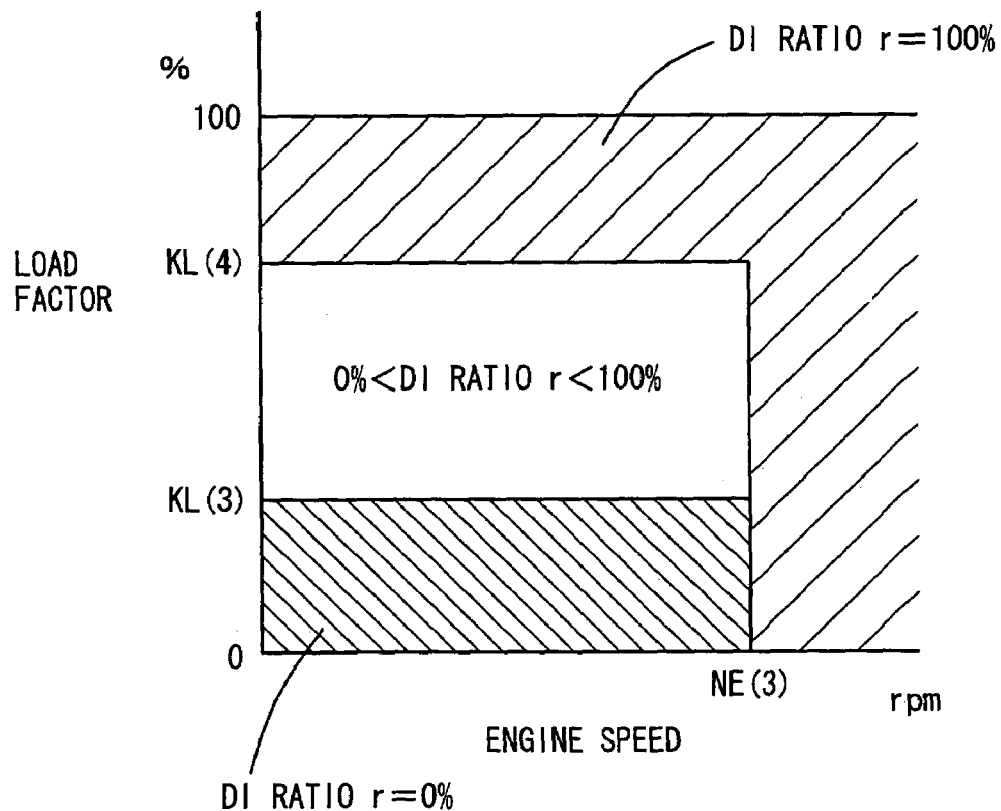
FIG. 4 represents a DI ratio map corresponding to a cold state of an engine to which the control apparatus of an embodiment of the present invention is suitably adapted.

Referring to FIGS. 3 and 4, maps indicating a fuel injection ratio (hereinafter, also referred to as DI ratio (r)) between in-cylinder injector 110 and intake manifold injector 120, identified as information associated with an operation state of engine 10, will now be described. The maps are stored in ROM 320 of an engine ECU 300. FIG. 3 is the map for a warm state of engine 10, and FIG. 4 is the map for a cold state of engine 10.

In the maps of FIGS. 3 and 4, the fuel injection ratio of in-cylinder injector 110 is expressed in percentage as the DI ratio r, wherein the engine speed of engine 10 is plotted along the horizontal axis and the load factor is plotted along the vertical axis.

As shown in FIGS. 3 and 4, the DI ratio r is set for each operation region that is determined by the engine speed and the load factor of engine 10. "DI RATIO r=100%" represents the region where fuel injection is carried out from in-cylinder injector 110 alone, and "DI RATIO r=0%" represents the region where fuel injection is carried out from intake manifold injector 120 alone. "DI RATIO r≠0%", "DI RATIO r≠100%" and "0%<DI RATIO r<100%" each represent the region where in-cylinder injector 110 and intake manifold injector 120 partake in fuel injection. Generally, in-cylinder injector 110 contributes to an increase of power performance, whereas intake manifold injector 120 contributes to uniformity of the air-fuel mixture. These two types of injectors having different characteristics are appropriately selected depending on the engine speed and the load factor of engine 10, so that only homogeneous combustion is conducted in the normal operation state of engine 10 (for example, a catalyst warm-up state during idling is one example of an abnormal operation state).

Further, as shown in FIGS. 3 and 4, the DI ratio r of in-cylinder injector 110 and intake manifold injector 120 is defined individually in the maps for the warm state and the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 3 is selected; otherwise, the map for the cold state shown in FIG. 4 is selected. In-cylinder injector 110 and/or intake manifold injector 120 are controlled based on the engine speed and the load factor of engine 10 in accordance with the selected map.

The engine speed and the load factor of engine 10 set in FIGS. 3 and 4 will now be described. In FIG. 3, NE(1) is set to 2500 rpm to 2700 rpm, KL(1) is set to 30% to 50%, and KL(2) is set to 60% to 90%. In FIG. 4, NE(3) is set to 2900 rpm to 3100 rpm. That is, NE(1)<NE(3). NE(2) in FIG. 3 as well as KL(3) and KL(4) in FIG. 4 are also set appropriately.

In comparison between FIG. 3 and FIG. 4, NE(3) of the map for the cold state shown in FIG. 4 is greater than NE(1) of the map for the warm state shown in FIG. 3. This shows that, as the temperature of engine 10 becomes lower, the control region of intake manifold injector 120 is expanded to include the region of higher engine speed. That is, in the case where engine 10 is cold, deposits are unlikely to accumulate in the injection hole of in-cylinder injector 110 (even if fuel is not injected from in-cylinder injector 110). Thus, the region where fuel injection is to be carried out using intake manifold injector 120 can be expanded, whereby homogeneity is improved.

In comparison between FIG. 3 and FIG. 4, "DI RATIO r=100%" in the region where the engine speed of engine 10 is NE(1) or higher in the map for the warm state, and in the region where the engine speed is NE(3) or higher in the map for the cold state. In terms of load factor, "DI RATIO r=100%" in the region where the load factor is KL(2) or greater in the map for the warm state, and in the region where the load factor is KL(4) or greater in the map for the cold state. This means that in-cylinder injector 110 alone is used in the region of a predetermined high engine speed, and in the region of a predetermined high engine load. That is, in the high speed region or the high load region, even if fuel injection is carried out through in-cylinder injector 110 alone, the engine speed and the load of engine 10 are so high and the intake air quantity so sufficient that it is readily possible to obtain a homogeneous air-fuel mixture using only in-cylinder injector 110. In this manner, the fuel injected from in-cylinder injector 110 is atomized in the combustion chamber involving latent heat of vaporization (or, absorbing heat from the combustion chamber). Thus, the temperature of the air-fuel mixture is decreased at the compression end, so that the anti-knocking performance is improved. Further, since the temperature in the combustion chamber is decreased, intake efficiency improves, leading to high power.

In the map for the warm state in FIG. 3, fuel injection is also carried out using in-cylinder injector 110 alone when the load factor is KL(1) or less. This shows that in-cylinder injector 110 alone is used in a predetermined low-load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, in which case accumulation of deposits is prevented. Further, clogging at in-cylinder injector 110 may be prevented while ensuring the minimum fuel injection quantity thereof. Thus, in-cylinder injector 110 solely is used in the relevant region.

In comparison between FIG. 3 and FIG. 4, the region of "DI RATIO r=0%" is present only in the map for the cold state of FIG. 4. This shows that fuel injection is carried out through intake manifold injector 120 alone in a predetermined low-load region (KL(3) or less) when the temperature of engine 10 is low. When engine 10 is cold and low in load and the intake air quantity is small, the fuel is less susceptible to atomization. In such a region, it is difficult to ensure favorable combustion with the fuel injection from in-cylinder injector 110. Further, particularly in the low-load and low-speed region, high power using in-cylinder injector 110 is unnecessary. Accordingly, fuel injection is carried out through intake manifold injector 120 alone, without using in-cylinder injector 110, in the relevant region.

Further, in an operation other than the normal operation, or, in the catalyst warm-up state during idling of engine 10 (an abnormal operation state), in-cylinder injector 110 is controlled such that stratified charge combustion is effected. By causing the stratified charge combustion only during the catalyst warm-up operation, warming up of the catalyst is promoted to improve exhaust emission.

<Engine (2) to which Present Control Apparatus is Suitably Adapted>

An engine (2) to which the control apparatus of the present embodiment is suitably adapted will be described hereinafter. In the following description of the engine (2), the configurations similar to those of the engine (1) will not be repeated.

Figure 5:
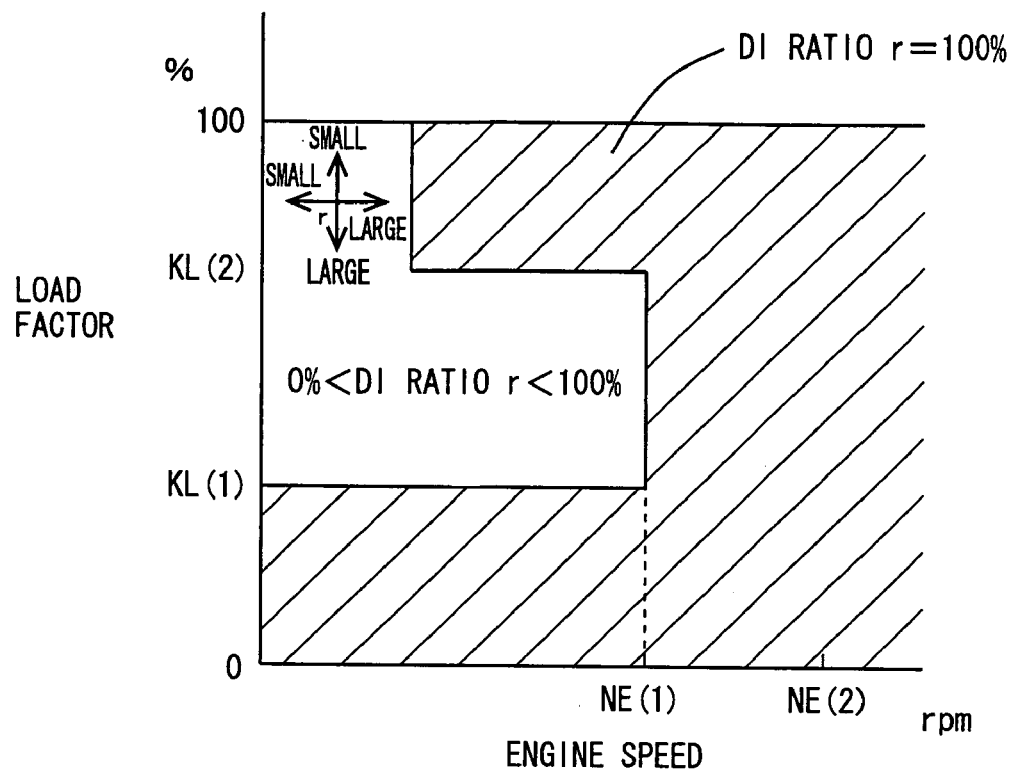
FIG. 5 represents a DI ratio map corresponding to a warm state of an engine to which the control apparatus of an embodiment of the present invention is suitably adapted.
Figure 6:
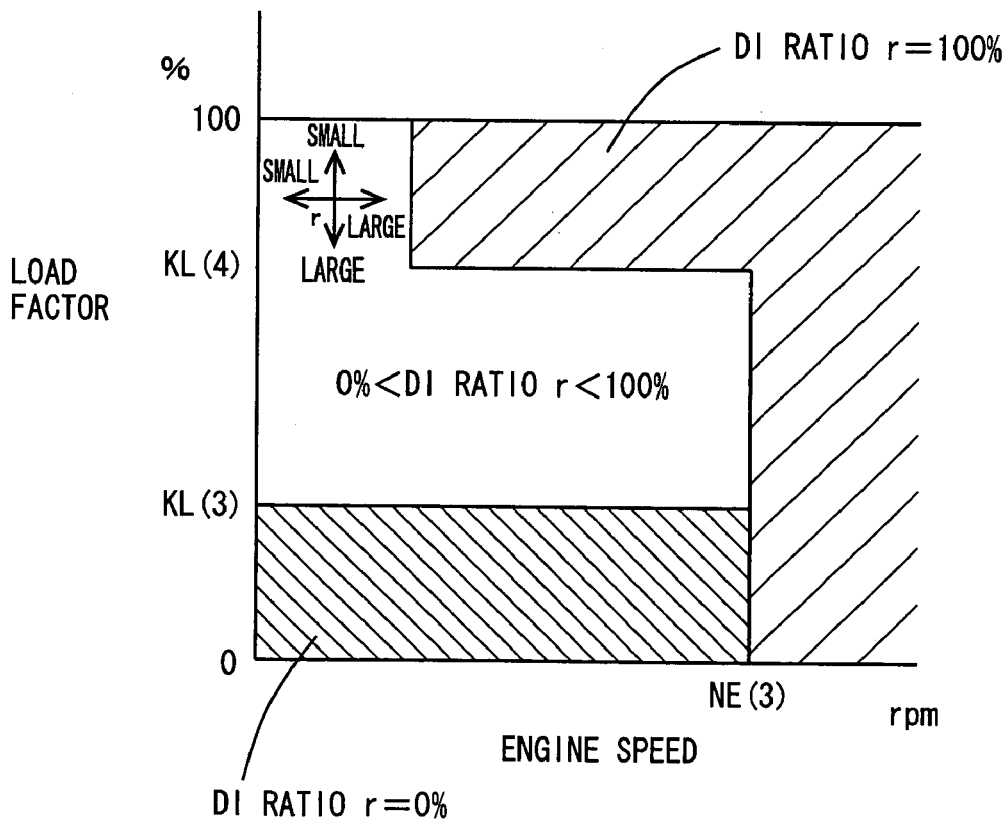
FIG. 6 represents a DI ratio map corresponding to a cold state of an engine to which the control apparatus of an embodiment of the present invention is suitably adapted.

Referring to FIGS. 5 and 6, maps indicating the fuel injection ratio between in-cylinder injector 110 and intake manifold injector 120, identified as information associated with the operation state of engine 10, will be described. The maps are stored in ROM 320 of an engine ECU 300. FIG. 5 is the map for the warm state of engine 10, and FIG. 6 is the map for the cold state of engine 10.

FIGS. 5 and 6 differ from FIGS. 3 and 4 in the following points. "DI RATIO r=100%" holds in the region where the engine speed of engine 10 is equal to or higher than NE(1) in the map for the warm state, and in the region where the engine speed is NE(3) or higher in the map for the cold state. Further, "DI RATIO r=100%" holds in the region, excluding the low-speed region, where the load factor is KL(2) or greater in the map for the warm state, and in the region, excluding the low-speed region, where the load factor is KL(4) or greater in the map for the cold state. This means that fuel injection is carried out through in-cylinder injector 110 alone in the region where the engine speed is at a predetermined high level, and that fuel injection is often carried out through in-cylinder injector 110 alone in the region where the engine load is at a predetermined high level. However, in the low-speed and high-load region, mixing of an air-fuel mixture produced by the fuel injected from in-cylinder injector 110 is poor, and such inhomogeneous air-fuel mixture within the combustion chamber may lead to unstable combustion. Thus, the fuel injection ratio of in-cylinder injector 110 is to be increased as the engine speed increases where such a problem is unlikely to occur, whereas the fuel injection ratio of in-cylinder injector 110 is to be decreased as the engine load increases where such a problem is likely to occur. These changes in the DI ratio r are shown by crisscross arrows in FIGS. 5 and 6. In this manner, variation in output torque of the engine attributable to the unstable combustion can be suppressed. It is noted that these measures are substantially equivalent to the measures to decrease the fuel injection ratio of in-cylinder injector 10 in connection with the state of the engine moving towards the predetermined low speed region, or to increase the fuel injection ratio of in-cylinder injector 110 in connection with the engine state moving towards the predetermined low load region. Further, in a region other than the region set forth above (indicated by the crisscross arrows in FIGS. 5 and 6) and where fuel injection is carried out using only in-cylinder injector 110 (on the high speed side and on the low load side), the air-fuel mixture can be readily set homogeneous even when the fuel injection is carried out using only in-cylinder injector 110. In this case, the fuel injected from in-cylinder injector 110 is atomized in the combustion chamber involving latent heat of vaporization (by absorbing heat from the combustion chamber). Accordingly, the temperature of the air-fuel mixture is decreased at the compression end, whereby the antiknock performance is improved. Further, with the decreased temperature of the combustion chamber, intake efficiency is improved, leading to high power output.

In engine 10 described in conjunction with FIGS. 3–6, homogeneous combustion is realized by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in totality is ignited in the combustion chamber to realize the stratified charge combustion. Even if the fuel injection timing of in-cylinder injector 110 is set in the intake stroke, stratified charge combustion can be realized if a rich air-fuel mixture can be located locally around the spark plug.

As used herein, the stratified charge combustion includes both the stratified charge combustion and semi-stratified charge combustion set forth below. In the semi-stratified charge combustion, intake manifold injector 120 injects fuel in the intake stroke to generate a lean and homogeneous air-fuel mixture in totality in the combustion chamber, and then in-cylinder injector 110 injects fuel in the compression stroke to generate a rich air-fuel mixture around the spark plug, so as to improve the combustion state. Such a semi-stratified charge combustion is preferable in the catalyst warm-up operation for the following reasons. In the catalyst warm-up operation, it is necessary to considerably retard the ignition timing and maintain a favorable combustion state (idling state) so as to cause a high-temperature combustion gas to arrive at the catalyst. Further, a certain quantity of fuel must be supplied. If the stratified charge combustion is employed to satisfy these requirements, the quantity of fuel will be insufficient. With the homogeneous combustion, the retarded amount for the purpose of maintaining favorable combustion is small as compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine described in conjunction with FIGS. 3–6, the fuel injection timing by in-cylinder injector 110 is preferably set in the compression stroke for the reason set forth below. It is to be noted that, for most of the fundamental region (here, the fundamental region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state), the fuel injection timing of in-cylinder injector 110 is set at the intake stroke. The fuel injection timing of in-cylinder injector 110, however, may be set temporarily in the compression stroke for the purpose of stabilizing combustion, as will be described hereinafter.

When the fuel injection timing of in-cylinder injector 110 is set in the compression stroke, the air-fuel mixture is cooled by the fuel injection during the period where the temperature in the cylinder is relatively high. This improves the cooling effect and, hence, the antiknock performance. Further, when the fuel injection timing of in-cylinder injector 110 is set in the compression stroke, the time required starting from fuel injection up to the ignition is short, so that the air current can be enhanced by the atomization, leading to an increase of the combustion rate. With the improvement of antiknock performance and the increase of combustion rate, variation in combustion can be obviated to allow improvement in combustion stability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine including a first fuel injection mechanism injecting fuel into a cylinder, a second fuel injection mechanism injecting fuel into an intake manifold, a first fuel supply mechanism supplying fuel to said first fuel injection mechanism, and a second fuel supply mechanism supplying fuel to said second fuel injection mechanism, said control apparatus comprising:

an abnormality determination unit determining presence of abnormality in at least one of said first fuel injection mechanism and said first fuel supply mechanism, a current control valve provided in an intake manifold to control current by altering a whirling state of intake air, and a control unit controlling said first and second fuel injection mechanisms such that said first and second fuel injection mechanisms partake in fuel injection, including a state of injection from one of said first and second fuel injection mechanisms being ceased, and controlling said current control valve, wherein said control unit controls said current control valve such that said intake air whirls in large circles when said abnormality determination unit determines presence of abnormality in one of said first fuel injection mechanism and said first fuel supply mechanism.

2. The control apparatus for an internal combustion engine according to claim 1, wherein said control unit controls a fuel injection such that fuel is injected from said second fuel injection mechanism.

3. The control apparatus for an internal combustion engine according to claim 1, wherein said control unit controls a fuel injection such that fuel is injected from at least said first fuel injection mechanism using said second fuel supply mechanism when said abnormality determination unit determines presence of abnormality in said first fuel supply mechanism, and does not determine presence of abnormality in said first fuel injection mechanism.

4. The control apparatus for an internal combustion engine according to claim 1, further comprising an adjustment unit adjusting a variable valve timing mechanism provided at said internal combustion engine such that, when said abnormality determination unit determines presence of abnormality, overlap of intake valves and exhaust valves is reduced as compared to a case where determination is made of no abnormality.

5. The control apparatus for an internal combustion engine according to claim 1, further comprising an adjustment unit adjusting an ignition system provided at said internal combustion engine such that, when said abnormality determination unit determines presence of abnormality, a basic ignition timing of said ignition system is the basic ignition timing corresponding to a case where said intake air whirls in large circles by said current control valve.

6. The control apparatus for an internal combustion engine according to claim 1, further comprising a calculation unit calculating a quantity of fuel injected from said fuel injection mechanism corresponding to a whirling state of said intake air by said current control valve.

7. The control apparatus for an internal combustion engine according to claim 1, further comprising a calculation unit calculating a quantity of fuel injected from said fuel injection mechanism such that an air-fuel ratio attains a target air-fuel ratio based on a quantity of intake air when said current control valve is controlled such that said intake air whirls in large circles.

8. The control apparatus for an internal combustion engine according to claim 1, wherein said current control valve is provided at at least one of two or more channels dividing intake air introduced into one combustion chamber, and said intake air whirls in large circle by said current control valve being closed.

9. The control apparatus for an internal combustion engine according to claim 1, wherein a direction of said whirl is at least one of a direction parallel to a reciprocation direction of a piston and a direction vertical to said reciprocation direction of a piston.

10. The control apparatus for an internal combustion engine according to claim 1, wherein said first fuel injection mechanism is an in-cylinder injector, and said second fuel injection mechanism is an intake manifold injector.

11. A control apparatus for an internal combustion engine including first fuel injection means for injecting fuel into a cylinder, second fuel injection means for injecting fuel into an intake manifold, first fuel supply means for supplying fuel to said first fuel injection means, and second fuel supply means for supplying fuel to said second fuel injection means, said control apparatus comprising:
    abnormality determination means for determining presence of abnormality in at least one of said first fuel injection means and said first fuel supply means,
    a current control valve provided in an intake manifold to control current by altering a whirling state of intake air, and
    control means for controlling said first and fuel injection means such that said first and second fuel injection means partake in fuel injection, including a state of injection from one of said first fuel injection means and said second fuel injection means being ceased, and controlling said current control valve,
    wherein said control means comprises means for controlling said current control valve such that said intake air whirls in large circles when said abnormality determination means determines presence of abnormality in one of said first fuel injection means and said first fuel supply means.

12. The control apparatus for an internal combustion engine according to claim 11, wherein said control means further comprises means for controlling a fuel injection such that fuel is injected from said second fuel injection means.

13. The control apparatus for an internal combustion engine according to claim 11, wherein said control means comprises means for controlling a fuel injection such that fuel is injected from at least said first fuel injection means using said second fuel supply means when said abnormality determination means determines presence of abnormality in said first fuel supply means, and does not determine presence of abnormality in said first fuel injection means.

14. The control apparatus for an internal combustion engine according to claim 11, further comprising means for adjusting a variable valve timing mechanism provided at said internal combustion engine such that, when said abnormality determination means determines presence of abnormality, overlap of intake valves and exhaust valves is reduced as compared to a case where determination is made of no abnormality.

15. The control apparatus for an internal combustion engine according to claim 11, further comprising means for adjusting an ignition system provided at said internal combustion engine such that, when said abnormality determination means determines presence of abnormality, a basic ignition timing of said ignition system is the basic ignition timing corresponding to a case where said intake air whirls in large circles by said current control valve.

16. The control apparatus for an internal combustion engine according to claim 11, further comprising means for calculating a quantity of fuel injected from said fuel injection means corresponding to a whirling state of said intake air by said current control valve.

17. The control apparatus for an internal combustion engine according to claim 11, further comprising means for calculating a quantity of fuel injected from said fuel injection means such that an air-fuel ratio attains a target air-fuel ratio based on a quantity of intake air when said current control valve is controlled such that said intake air whirls in large circles.

18. The control apparatus for an internal combustion engine according to claim 11, wherein said current control valve is provided at at least one of two or more channels dividing intake air introduced into one combustion chamber, and said intake air whirls in large circle by said current control valve being closed.

19. The control apparatus for an internal combustion engine according to claim 11, wherein a direction of said whirl is at least one of a direction parallel to a reciprocation direction of a piston and a direction vertical to said reciprocation direction of a piston.

20. The control apparatus for an internal combustion engine according to claim 11, wherein said first fuel injection means is an in-cylinder injector, and said second fuel injection means is an intake manifold injector.

* * * * *